(12) United States Patent
Jiang et al.

(10) Patent No.: US 11,408,797 B2
(45) Date of Patent: Aug. 9, 2022

(54) GIL FAULT ON-LINE MONITORING SYSTEM BASED ON VIBRATION SIGNALS AND SUPPORT VECTOR MACHINE

(71) Applicants: QUJING BUREAU, CSG EHV POWER TRANSMISSION COMPANY, Yunnan (CN); WUHAN INTELLIGENT EQUIPMENT INDUSTRIAL INSTITUTE CO., LTD., Wuhan (CN)

(72) Inventors: Long Jiang, Yunnan (CN); Yining Qin, Yunnan (CN); Xueshen Hu, Yunnan (CN); Xianwu Cao, Yunnan (CN); Dong Li, Yunnan (CN); Tianman Pi, Yunnan (CN); Yulu Gong, Yunnan (CN); Chunyan Zang, Wuhan (CN); Yaoyun Liu, Wuhan (CN); Dianlang Wang, Yunnan (CN)

(73) Assignees: Qujing Bureau, CSG EHV Power Transmission Company, Yunnan (CN); Wuhan Intelligent Equipment Industrial Institute Co., Ltd., Wuhan (CN)

( * ) Notice: Subject to any disclaimer, the term of this patent is extended or adjusted under 35 U.S.C. 154(b) by 394 days.

(21) Appl. No.: 16/322,114

(22) PCT Filed: Feb. 8, 2018

(86) PCT No.: PCT/CN2018/075789
§ 371 (c)(1),
(2) Date: Jan. 31, 2019

(87) PCT Pub. No.: WO2019/015311
PCT Pub. Date: Jan. 24, 2019

(65) Prior Publication Data
US 2019/0195727 A1    Jun. 27, 2019

(30) Foreign Application Priority Data

Dec. 22, 2017    (CN) .......................... 201711406598.4

(51) Int. Cl.
*G01M 5/00*    (2006.01)
*G01M 7/00*    (2006.01)
(Continued)

(52) U.S. Cl.
CPC ............ *G01M 5/0066* (2013.01); *G01H 1/00* (2013.01); *G01M 5/0025* (2013.01);
(Continued)

(58) Field of Classification Search
CPC .... G01M 5/0066; G01M 5/0025; G01M 7/00; G01M 5/0033; G01H 1/00; G08C 17/02; H04Q 9/00
(Continued)

(56) References Cited

U.S. PATENT DOCUMENTS

| | | | |
|---|---|---|---|
| 2013/0233083 A1* | 9/2013 | Hofelsauer | G01H 1/00 73/649 |
| 2016/0238438 A1* | 8/2016 | Chen | G01M 5/0033 |

FOREIGN PATENT DOCUMENTS

| | | | |
|---|---|---|---|
| CN | 103398769 A | | 11/2013 |
| CN | 104236911 A | * | 12/2014 |

(Continued)

OTHER PUBLICATIONS

English translation of CN 104236911, Dec. 2014. (Year: 2014).*
English translation of CN 105 760839. Jul. 2016. (Year: 2016).*

*Primary Examiner* — Michael P Nghiem
(74) *Attorney, Agent, or Firm* — Seyfarth Shaw LLP

(57) ABSTRACT

A GIL fault on-line monitoring system based on vibration signals and support vector machine, via a monitoring device mounting on the outer surface of the CIL channel, monitors
(Continued)

the vibration signals generated on the tube wall during the power transmission process, and perform fault diagnosis through comparison. For example, when the abnormal vibration signals appear near a certain post insulators, then it can be determined that the corresponding location is experiencing a fault. The system is capable of operating without powering off the GIL or disassembling the GIL, thus it is an economic, convenient and effective troubleshooting method with high implementation feasibility. The system can monitor the operation state of the GIL in real time and send information to a monitoring station through a wireless device, and thus guarantees the stable operation of the GIL.

5 Claims, 3 Drawing Sheets

(51) Int. Cl.
*G01H 1/00* (2006.01)
*G08C 17/02* (2006.01)
*H04Q 9/00* (2006.01)

(52) U.S. Cl.
CPC ............ *G01M 5/0033* (2013.01); *G01M 7/00* (2013.01); *G08C 17/02* (2013.01); *H04Q 9/00* (2013.01)

(58) Field of Classification Search
USPC .......................................................... 702/56
See application file for complete search history.

(56) References Cited

FOREIGN PATENT DOCUMENTS

| | | | |
|---|---|---|---|
| CN | 104236911 | A | 12/2014 |
| CN | 204612929 | U | 9/2015 |
| CN | 105424364 | A | 3/2016 |
| CN | 105760839 | A * | 7/2016 |
| CN | 105760839 | A | 7/2016 |
| CN | 208076016 | U * | 11/2018 |

* cited by examiner

GIL FAULT ON-LINE MONITORING SYSTEM BASED ON VIBRATION SIGNALS AND SUPPORT VECTOR MACHINE

CROSS REFERENCE TO THE RELATED APPLICATIONS

This application is the national phase entry of International Application PCT/CN2018/075789, filed on Feb. 8, 2018, which is based on and claims priority from Chinese Patent Application CN201711406598.4 filed on Dec. 22, 2017, the entire contents of which are incorporated herein by reference.

TECHNICAL FIELD

The present invention relates to the technical field of high-voltage power transmission lines and on-line monitoring, and particularly, to a GIL fault on-line monitoring system based on vibration signals and support vector machine.

BACKGROUND

A gas-insulated metal-enclosed transmission line (GIL) is a high-voltage, large-current and long-distance power transmission device, which is insulated with SF6 or other gases and of which a shell and a conductor are coaxially arranged, and has remarkable advantages of high power-transmission capacity, small footprint, flexible arrangement, high reliability, small maintenance workload, long life and high resistance to environmental influence. With the vigorous promotion of urbanization and continuous development of extra-high voltage power grid construction in recent years, the load of urban power grids is increased and the use of the GIL in the West-to-east power transmission project in our country is gradually increased.

As an effective supplement to a traditional underground power transmission cable in maximum capacity occasions and an overhead line in some special use occasions, the GILs, with the advantages of high transmission capacity, low loss, low electromagnetic radiation, high space utilization ratio and the like, have gradually replaced the traditional overhead power transmission lines and high-voltage cables. However, in the large-scale application of the GIL, as a guarantee for its stable operation, GIL fault monitoring methods have gradually attracted attention. Traditional methods have problems, such as high safety risks and requiring the power to be cut off, which need to be solved.

Faults such as partial discharge, insulation device faults and disruptive discharge may occur during the manufacture, transportation, assembly, adjustment and operation of the GIL. During troubleshooting and daily maintenance, due to the large length of GIL, it is impossible to timely and accurately localize the fault, and it requires to disassemble the device during examination, which consume a lot of manpower, materials and money, retards the maintenance progress and thus results in unnecessary economic loss.

Currently, in the GIL monitoring, faults are localized by adopting vibration or ultrasonic signal monitoring methods. However, the existing detection devices still have the following technical problems in practical applications:

1) Currently, the GIL fault diagnosis research is mainly concentrated on detection of discharging faults, while the related research on mechanical fault detection based on vibration signal is still not through enough;

2) If data between monitoring devices and terminals of a system is transmitted by means of wires such as optical fiber cables, although wires can realize real-time data transmission and time synchronization between devices, due to the large length of GIL, the cost of signal transmission through wires is too high and the maintenance difficulty is increased;

3) The monitoring devices and terminals of the system can also communicate with one another with aid of wireless transmission devices. Wireless transmission has the following advantages: it does not require specific transmission wires such as optical fiber, and the cost is reduced; during a maintenance process, only the monitoring devices need to be examined while the it is not necessary to examine the lines; when the device experiences a fault, replacement and repair are easy; and the operation and installation are convenient since the devices are small. But it has the disadvantage that time synchronization between the detection devices cannot be realized.

4) There is no effective means for the diagnosis of common GIL faults, and it is impossible to realize on-line monitoring and diagnosis to judge the type of the GIL faults and the approximate location of the fault based on the monitoring signals.

SUMMARY

One object of the present invention is to provide a GIL fault on-line monitoring system based on vibration signals and support vector machine, which has the features of simple structure, small volume, and simple installation and operation.

In order to achieve the above object, the present invention provides the following technical solutions.

A GIL fault on-line monitoring system based on vibration signals and support vector machine, comprising a vibration sensor which is secured to a shell of a post insulator of a GIL to be monitored, and a data collector which is connected to an output end of the vibration sensor; the data collector is connected to a wireless gateway through a wireless manner and is connected to a terminal computer via the wireless gateway; through a support vector machine-based fault recognition model, the terminal computer is capable of determining whether the GIL is experiencing a fault, identifying a type of the fault and locating the fault; and steps for diagnosing the GIL fault by the support vector machine are as follows:

1) acquiring vibration acceleration signals: acquiring vibration acceleration signals under different GIL states, and classifying by using types of the GIL states as labels and using corresponding vibration acceleration signal data as corresponding data samples;

2) extracting feature parameters: extracting feature parameters of the vibration acceleration signals in a time domain, a frequency domain and a time-frequency domain;

3) constructing and training an SVM fault diagnosis model: performing feature extraction on the vibration acceleration signals at the different GIL states, and constructing and training an SVM fault diagnosis model by means of an LIBSVM toolkit, and the mathematical expression of the fault diagnosis model is as follows:

$$K(x, x_i) = \exp\left(-\frac{|x - x_i|^2}{2\sigma^2}\right),$$

wherein σ is a kernel width parameter; and 4) based on the fault diagnosis model, diagnosing the fault, identifying the type of the fault and locating the fault.

The data collector comprises an amplifier, a wave filter, an analog-to-digital converter, a microcontroller unit (MCU) and a wireless communication module which are sequentially connected; the amplifier is connected to the output end of the vibration sensor, and the wireless communication module is connected to the wireless gateway through radio signals.

The vibration sensor is an acceleration sensor and a +3 dB frequency thereof is ranging from 50 Hz to 15 kHz.

The vibration sensor is attached to the shell of the insulator, wherein a size and a curvature thereof can be adjusted according to a size of the shell of the insulator.

Radio signals containing time information are sent by the terminal computer to realize time synchronization between various data collectors and the terminal computer, and steps are as follows:

a) setting a time of the terminal computer as a reference;

b) sending time signals to the data collectors through wireless signals; and c) the various data collectors receiving the time signals simultaneously so as to realize the time synchronization between the data collectors based on the signals.

Steps for extracting feature parameters in step 2) are as follows:

A. extracting a dimensional feature vector $A=[A_1, A_2, \ldots, A_{10}]$ and a dimensionless feature vector $B=[B_1, B_2, \ldots, B_6]$ in the time domain;

B. extracting a feature vector $E=[E_1, E_2, \ldots, E_5]$ in the frequency domain;

C. extracting a feature vector $K=[p_0, p_1, \ldots, p_{2^j-1}]$ in the time-frequency domain;

D. selecting a feature vector containing thirteen feature values:

$T=[A_6, A_7, A_8, A_9, B_5, B_2, B_3, p_2, p_1, p_4, E_1, E_3, E_5]$; and

E. changing the dimension number according to a contribution degree of 90% from the above feature vector containing the thirteen feature vectors, so as to produce a feature vector $T=[E_1, A_9, E_3, E_5, p_2]$ which has a lower dimension number.

The present invention has the following advantages:

The fault on-line monitoring system of the present invention is capable of operating without powering off the GIL or disassembling the GIL, thus it is an economic, convenient and effective troubleshooting method with high implementation feasibility. The system can monitor the operation state of the GIL in real time and send information to a monitoring station through a wireless device, and thus guarantees the stable operation of the GIL. The system has solved the problems of high live-working risk, complex power-off operation process and the influences on power transmission during GIL channel detection and fault analysis. The system has the features of simple structure, small volume, and simple installation and operation.

DETAILED DESCRIPTION OF THE EMBODIMENTS

Figure 1:
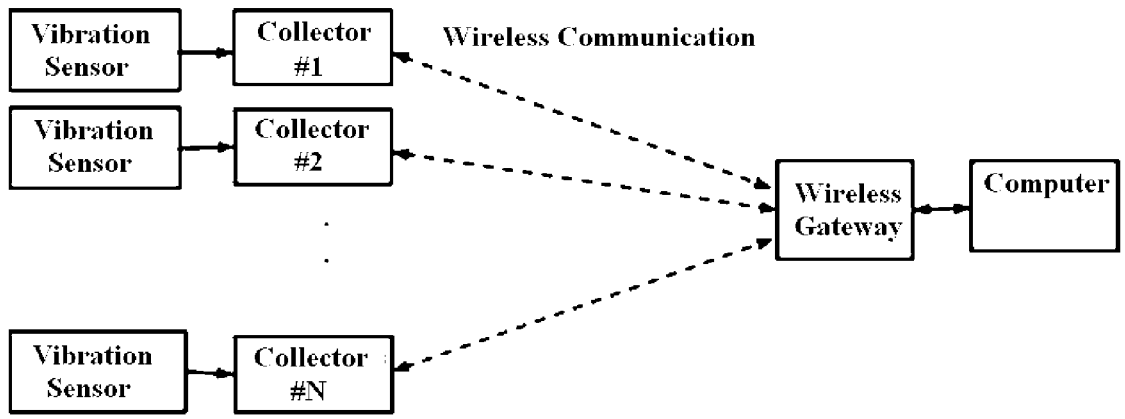
FIG. 1 is a schematic diagram of data collection and transmission in an embodiment.
Figure 2:
FIG. 2 is a block diagram of a data collector in the embodiment.
Figure 3:
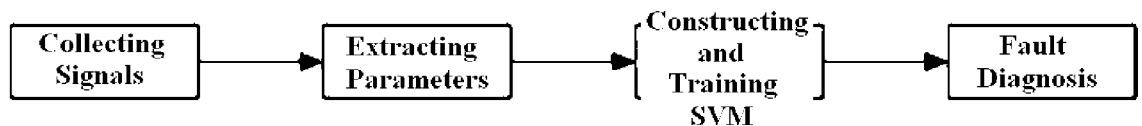
FIG. 3 is a flow chart of GIL fault diagnosis based on vibration signals in the embodiment.

The content of the present invention will be further illustrated in detail below with reference to the drawings and embodiments.

The GIL fault on-line monitoring system, based on vibration signals and support vector machine, generally comprises vibration sensors which are attached to the shell of each post insulator of the GIL to be monitored, and data collectors (each data collector is connected to an output end of one of the vibration sensors). The data collector is connected to a wireless gateway through a wireless manner and is connected to a terminal computer via the wireless gateway.

Vibration information of the channel is collected via the bolt-on vibration sensor mounted on the outer surface of the GIL three-phase insulator and then transmitted to a base station above ground via a signal transmission device.

The received signals are then subjected to comparative analysis with specific data with the aids of software in the base station, so as to determine the operation state, and the fault location and cause of the GIL line.

The specific data is obtained as follows. Different vibration waveforms corresponding to different GIL states are plotted through related simulation tests in a laboratory, so as to construct a related database for comparative analysis.

The system can further comprise a power source portion. A small-size solar panel and a micro lithium battery are used cooperatively to supply power. The solar panel is used to supply power when sunlight is sufficient and spare power is stored in the lithium battery. The lithium battery is used for compensation when the sunlight is insufficient. The power of a solar battery is about 1 W and the capacity of the lithium battery is 2,000 mAH.

A detection portion of the system comprises a 240-degree dual-guide-rail arcuate support (the top of the support is a planar waterproof box, a microchip and the battery are mounted inside the box, and the solar panel is attached to the surface of the box), a curved bolt-on vibration sensor, and a strip-shaped anti-slip fixing device.

Method and location of installation of the detection portion: Firstly the sensor is connected to the support, then the microchip and the lithium battery are fixed inside the waterproof insulation box at the top of the support, and afterwards, the photovoltaic panel is fixedly mounted on the surface of the box. The detection portion is then mounted at the three-phase insulator of the GIL line after the line is connected.

Through a support vector machine-based fault recognition model, people can determine whether the GIL is experiencing a fault, identify a type of the fault and locate the fault The support vector machine (SVM) method, based on the Statistical Learning Theory, is a machine learning theory mainly for small samples, and one of the basic ideas thereof is the structural risk minimization principle. In the field of mechanical fault diagnosis, the support vector machine is a recognition method with good performance and has better generalization ability than the neural network. For many traditional statistical methods, by introducing a kernel function, it is unnecessary to perform inner product calculation in a high-dimensional space when a linear space is mapped into the high-dimensional non-linear space, and all that is needed is to sum the samples, which is independent of the number of dimensions of the feature space, and thereby the curse of dimensionality is avoided and the accuracy of determination is improved. The algorithm of the support vector machine transforms the problem into a quadratic programming problem finally, such that, in theory, a global optimal solution can be obtained so as to avoid the problem of getting into the local minimum value in the neural network algorithm.

Figure 5:
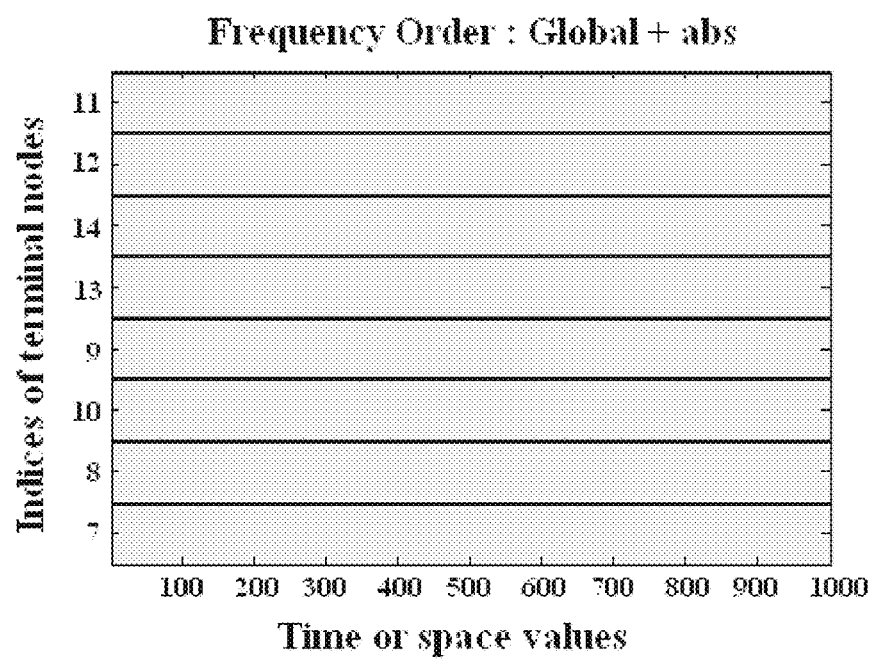
FIG. 5 shows the result of a wavelet packet decomposition of the vibration acceleration signal in the fault state 2 in the embodiment.

A fault classification model is constructed with the support vector machine, feature vectors for fault diagnosis are obtained by performing data processing on different types of data, and the fault diagnosis model is trained and verified with the LIBSVM toolkit. Primary steps for diagnosing GIL faults via the support vector machine are as shown in FIG. 5.

The specific diagnosis steps are as follows.

1. Acquiring vibration acceleration signals. In the diagnosis process, it is required to acquire vibration acceleration signals under different GIL states, and classify by using types of the GIL states as labels and using corresponding vibration acceleration signal data as corresponding data samples.

2. Extracting feature parameters. From the vibration acceleration signals, feature parameters are extracted in three aspects, i.e., a time domain, a frequency domain and a time-frequency domain, a feature vector containing thirteen feature values is screened out, and finally a five-dimensional feature vector T=[$E_1, A_9, E_3, E_5, p_2$] is obtained via principal component analysis.

The steps for extracting the feature parameters are as follows.

(1) Extracting Signal Feature Parameters in the Time Domain

The signal feature parameters in the time domain mainly comprise two potions, those having a dimension and those without a dimensionless. The feature parameters having a dimension can be affected by the GIL factors such as the voltage level, the structural size and the operation parameters, and it is necessary to perform a comparison between these parameters and historical data in order to realize better performance of fault diagnosis. The dimensionless parameters have a relatively closer relationship with the operation state of the GIL and are less sensitive to the changes of the load and operation parameter. These two types of parameters have respective advantages when adopted, and therefore, it is necessary to use the statistical parameters having a dimension and dimensionless statistical parameters in combination, as shown in table 1.

TABLE 1

Statistical feature parameters in time domain

| Number | Statistical feature in time domain | Feature calculation formula |
|---|---|---|
| $A_1$ | Mean value | $\mu = \frac{1}{N}\sum_{i=1}^{N} x_i \; (i = 1, 2, \ldots, N)$ |
| $A_2$ | Absolute mean value | $|\mu| = \frac{1}{N}\sum_{i=1}^{N} |x_i| \; (i = 1, 2, \ldots, N)$ |
| $A_3$ | Effective value | $RMS = \sqrt{\frac{1}{N}\sum_{i=1}^{N} x_i^2}$ |
| $A_4$ | Square root amplitude | $X_r = \left(\frac{1}{N}\sum_{i=1}^{N} \sqrt{|x_i|}\right)^2$ |
| $A_5$ | Peak | $Peak = \max(|x_i|) \; (i = 1, 2, \ldots, N)$ |
| $A_6$ | Variance | $\sigma^2 = \frac{1}{N-1}\sum_{i=1}^{N} (x_i - \mu)^2$ |
| $A_7$ | Standard deviation | $S = \sqrt{\frac{1}{N-1}\sum_{i=1}^{N} (x_i - \mu)^2}$ |
| $A_8$ | Skewness | $Skewness = \frac{1}{N}\sum_{i=1}^{N} x_i^3$ |
| $A_9$ | Kurtosis | $Kurtosis = \frac{1}{N}\sum_{i=1}^{N} x_i^4$ |
| $B_1$ | Waveform index | $Waveform\ index = \frac{RMS}{|\mu|}$ |
| $B_2$ | Crest index | $Crest\ index = \frac{\max|x_i|}{RMS}$ |
| $B_3$ | Impulse index | $Impluse\ index = \frac{\max|x_i|}{|\mu|}$ |
| $B_4$ | Margin index | $Margin\ index = \frac{\max|x_i|}{X_r}$ |
| $B_5$ | Skewness index | $Skewness\ index = \frac{Skewness}{S^3}$ |
| $B_6$ | Kurtosis index | $Kurtosis\ index = \frac{Kurtosis}{S^4}$ |

In table 1, the parameters $A_1$ to $A_9$ are parameter indexes having a dimension and the parameters $B_1$ to $B_6$ are dimensionless parameter indexes in the time domain.

The parameters having a dimension and the parameters not having a dimension in the time domain greatly differ from each other in value size; and also, the number of the parameters is relative large. Therefore, the signal feature parameters in the time domain are divided into two groups for constructing feature vectors, i.e., a dimensional feature vector A=[$A_1, A_2, \ldots, A_{10}$] and a dimensionless feature vector B=[$B_1, B_2, \ldots, B_6$] in the time domain.

(2) Extracting Feature Parameters in the Frequency Domain

A large amount of feature frequency information is contained in the frequency domain of the vibration acceleration signals and can reflect changes of structural state. Therefore, it is necessary to extract the feature parameters in the frequency domain. According to the frequency distribution feature of the vibration acceleration signals of GIL, the signal energy is mainly distributed within the range of 100-500 Hz, and is only distributed at the frequencies of 100 Hz and integer multiples thereof. Based on the types of feature parameters in the frequency domain and the frequency distribution feature of the signals of the GIL structure itself, the corresponding amplitudes of the vibration acceleration signal at five frequency points, i.e., 100 Hz, 200 Hz, 300 Hz, 400 Hz and 500 Hz are obtained through fast Fourier transform. These amplitudes constitute a set of feature vector E=[$E_1$, $E_2$, . . . , $E_5$].

(3) Extracting Feature Parameters in the Time-Frequency Domain

For non-stationary signals, traditional frequency spectrum analysis methods are not capable of giving all the signal features contained in the vibration signals. The major method for processing non-stationary signals is time-frequency analysis. The basic theory of wavelet transformation is introduced below.

Let $x(t) \in L^2(R)$, and continuous wavelet transformation of x(t) is defined as $$CWT_x(a, b) = |a|^{-1/2} \int_{-\infty}^{\infty} x(t) \varphi\left(\frac{t-b}{a}\right) dt,$$

wherein, φ(t) is a mother wavelet, a (not equal to zero) is a scale factor and b is a time shift factor. Different wavelet basis functions can be constructed with different a and b:

$$\varphi_{a,b}(t) = |a|^{-1/2} \varphi\left(\frac{t-b}{a}\right).$$

The wavelet packet transformation improves the time-frequency local-refinement ability of wavelet transformation towards signals that analysis signals are filtered through a series of low-pass and high-pass filters, thereby the original signals will be gradually decomposed by the filters into independent sub-signals represented by nodes, and the sub-signals are distributed in the form of a binary tree. Let $Q_{0,0}$ be a vector space corresponding to the node zero of the binary tree, then the wavelet sub-vector space of each node at each level can be subdivided into two sub-spaces orthogonal to each other:

$\Omega_{j,n} = \Omega_{j+1,2n} \oplus \Omega_{j+1,2n+1}$ wherein j is the level number, (j,n) is the node at the j-th level, and n=0, . . . , $2^{j-1}$.

A recurrence relation between an orthogonal scaling function $u_n(t)$ and a wavelet function $u_{2n}(t)$ is given by $$u_{2n}(j) = \sqrt{2} \sum_{k \in Z} h(k) u_n(2t - k)$$

$$u_{2n+1}(j) = \sqrt{2} \sum_{k \in Z} g(k) u_n(2t - k)$$

wherein g(k) and h(k) are filter coefficients of the low-pass and high-pass filters in the analysis.

The set {$u_n(t)$} defined above is an orthogonal wavelet packet. A decomposed signal of the signal x(t) in the sub-space $\Omega_{j,n}$ can be calculated by the following formula:

$$x_j^n(t) = \sum_{k \in K} D_k^{j,n} u_k^{j,n}(t), k \in Z,$$

wherein $D_k^{j,n}$ is a wavelet packet coefficient corresponding to the node (j, n).

The wavelet packet decomposition of the signal x(t) can be defined as:

$$x(t) = \sum_{n=1}^{2^{-j}} x_j^n = \sum_{n=1}^{2^{-j}} \sum_k D_k^{j,n} u_k^{j,n}(t),$$

wherein $u_{j,n}(t)$ is an orthogonal wavelet base.

The energy of the sub-frequency band signal $x_j^n(t)$ can be calculated by the following formula:

$E_{j,n} = \Sigma |D_k^{j,n}|^2$.

Then the normalized energy of the node (j, n) is calculated as:

$\overline{E}_{j,n} = E_{j,n} / \Sigma_{n=0}^{2^j} E_{j,n}$.

Generally, a wavelet packet transformation over three levels will give eight nodes, which means that a feature vector will contain eight feature values. The sum of squares of the wavelet coefficients of a certain feature frequency band is defined as the wavelet energy of the band:

$$E_m = \sum_k |C_m(k)|^2$$

wherein m=0, 1, . . . , $2^j-1$.

Then the expression of total energy is:

$$E_{tot} = \sum_m \sum_k |C_m(k)|^2 = \sum_m E_m.$$

The relative wavelet packet energy of a certain frequency band is defined as:

$$p_m = \frac{E_m}{E_{tot}}$$

wherein m=0, 1, . . . , $2^j-1$.

Then the following feature vector is obtained:

$K = (p_0, p_1, \ldots, p_{2^j-1})$

When a GIL device experiences a mechanical fault, the structure itself of the device will change, and the responses of the vibration signals in each frequency band will show different degrees of change. Thus, the use of the feature vectors, which are obtained through wavelet packet transformation, can achieve a better effect in the detection of GIL mechanical faults.

GIL vibration acceleration signal samples of three different states are obtained through simulation. For each type of vibration acceleration signals, vibration waveforms of 140 observation points are extracted from each node of the model, 420 vibration acceleration signal samples in total. From each vibration acceleration signal, vector extraction is performed to give four sets of feature vectors: A=[$A_1$, $A_2$, . . . , $A_{10}$], B=[$B_1$, $B_2$, . . . , $B_6$], E=[$E_1$, $E_2$, . . . , $E_5$] and K=[$p_0$, $p_1$, . . . , $p_{2^j-1}$].

An operation process of extracting feature parameters of sample data is illustrated by taking the feature vector K (constituted by wavelet packet energy) as an example. The three types of sample data are sequentially imported into a wavelet packet analysis program compiled in the MATLAB. In this feature value extraction process, the sampling frequency is 1024 Hz. and according to the sampling theorem, the Nyquist frequency is 512 Hz. Wavelet packet decomposition is performed over three levels using Meyer wavelet to give eight ($2^3$=8) frequency bands, and the frequency interval of each frequency band is 64 Hz.

Figure 4:
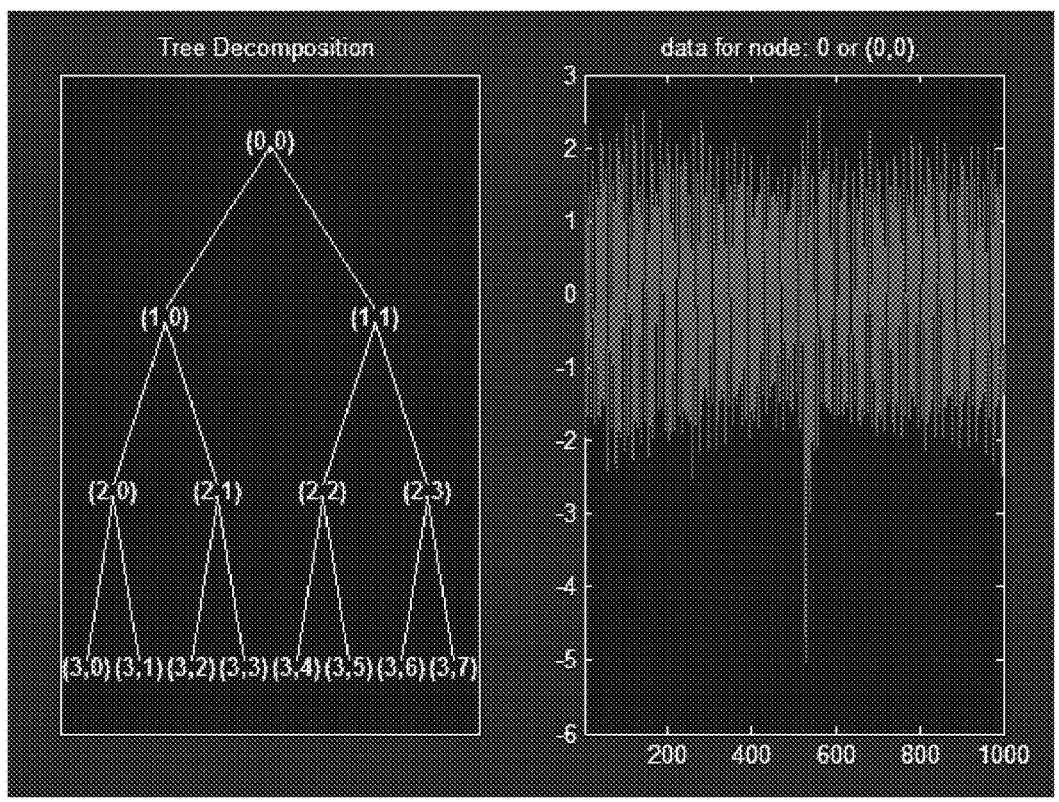
FIG. 4 is a diagram of a vibration acceleration signal in a fault state 2 in the embodiment.

As shown in FIGS. 4 and 5, the tree decomposition is a wavelet packet tree, wherein the node (0,0) represents an original decomposed signal, and the respective time domain signals are as shown in the "data for node: 0 or (0,0)" section at the right side. The sequential nodes (3,0), (3,1), ..., and (3,7) at the lowest level are frequency domain divisions after the decomposition over three levels. During the wavelet packet decomposition process, for a component subjected to high-frequency filtering, the order of frequency spectrum will reverses and the final order will be presented in the order of Gray codes, which means that, the nodes (3,0), (3,1), (3,3), (3,2), (3,6), (3,7), (3,5) and (3, 4), sequentially, correspond to the frequency bands of 0 to 64 Hz, 65 Hz to 128 Hz, ..., and 449 Hz to 512 Hz in an ascending order, and correspond to node numbers 7, 8, 10, 9, 13, 14, 12 and 11. The x-axis corresponds to 1,024 sample points in the time length of one second, each point corresponding to 1/1,024 second. The energy magnitude of the signal in each frequency band is represented by the shade of color: the darker the color is, the higher the vibration amplitude is.

After the vibration signals of different states are subjected to the wavelet packet decomposition, the major frequency components are all distributed at the frequency bands of node 8 (65 to 128 Hz) and node 10 (129 to 256 Hz), while high-frequency components with relatively smaller amplitudes can be observed at other frequency bands. For the vibration signal of the fault state 2, impulse signals at the time of t=0.52 s are also observed in the wavelet packet analysis spectrogram that, impulse amplitudes are observed at the time of t=0.52 s in a plurality of frequency bands. A relative wavelet packet energy feature value vector K=($p_0$, $p_1$, ..., $p_{2^j-1}$) (j=3) is extracted from the results of the above wavelet packet analysis, as shown in table 2. The above process of extracting each set of feature vector is applied to all samples in the same way. In order to reduce the length of this specification, we herein list only the processing results of four sets of feature vectors corresponding to four samples of each type: Samples S-A-1 to S-A-4 are four data samples of the first type (normal state), samples S-B-1 to S-B-4 are four data samples of the second type (fault state 1), and samples S-C-1 to S-C-4 are four data samples of the third type (fault state 2), as shown in table 2.

TABLE 2

The feature vector K constituted by energy of wavelet packets of three sample types

| Sample number | Feature value K | | | | | | | |
|---|---|---|---|---|---|---|---|---|
| | $p_1$ | $p_2$ | $p_3$ | $p_4$ | $p_5$ | $p_6$ | $p_7$ | $p_8$ |
| S-A-1 | 0.0579 | 0.5261 | 0.0311 | 0.2786 | 0.0254 | 0.0469 | 0.0071 | 0.0270 |
| S-A-2 | 0.0579 | 0.5267 | 0.0311 | 0.2789 | 0.0220 | 0.0483 | 0.0073 | 0.0278 |
| S-A-3 | 0.0581 | 0.5284 | 0.0307 | 0.2795 | 0.0230 | 0.0476 | 0.0060 | 0.0268 |
| S-A-4 | 0.0567 | 0.5113 | 0.0315 | 0.2714 | 0.0467 | 0.0449 | 0.010 | 0.0274 |
| Sample mean value | 0.0577 | 0.5231 | 0.0311 | 0.2771 | 0.0293 | 0.0469 | 0.0076 | 0.0273 |
| S-B-1 | 0.0575 | 0.5194 | 0.0330 | 0.2762 | 0.0263 | 0.0470 | 0.0114 | 0.0292 |
| S-B-2 | 0.0579 | 0.5250 | 0.0313 | 0.2781 | 0.0261 | 0.0472 | 0.0073 | 0.0272 |
| S-B-3 | 0.0575 | 0.5208 | 0.0316 | 0.2762 | 0.0285 | 0.0483 | 0.0086 | 0.0284 |
| S-B-4 | 0.0568 | 0.5119 | 0.0325 | 0.2722 | 0.0403 | 0.0463 | 0.0112 | 0.0288 |
| Sample mean value | 0.0574 | 0.5193 | 0.0321 | 0.2757 | 0.0303 | 0.0472 | 0.0096 | 0.0284 |
| S-C-1 | 0.1001 | 0.4226 | 0.0433 | 0.3418 | 0.0087 | 0.0664 | 0.0021 | 0.0151 |
| S-C-2 | 0.0858 | 0.4195 | 0.0418 | 0.3572 | 0.0083 | 0.0696 | 0.0024 | 0.0155 |
| S-C-3 | 0.0626 | 0.4318 | 0.0425 | 0.3659 | 0.0084 | 0.0710 | 0.0021 | 0.0158 |
| S-C-4 | 0.0689 | 0.4300 | 0.0416 | 0.3630 | 0.0081 | 0.0704 | 0.0020 | 0.0160 |
| Sample mean value | 0.0794 | 0.4260 | 0.0423 | 0.3570 | 0.0084 | 0.0694 | 0.0022 | 0.0156 |

According to the method mentioned above, four sets of feature vectors are extracted for all sample parameters. In order to reduce the length of this specification, we herein only provide the specific steps of data extraction of relative wavelet packet energy feature vector K. Through the above data processing method, a basic feature value vector database is obtained, which contains three types of sample data, 120 sets of data for each type, and four sets of feature vectors are extracted from each specific data sample which will be subjected to the later selecting step and fault classifier training and testing step. For the feature vector E which is constituted by typical frequency amplitudes and the feature vector K which is constituted by wavelet packet energy, the feature values therein are of the same unit dimension. In order to select a most recognizable feature value, two factors, the absolute value of a difference between corresponding feature values, and the relative change amplitude, are taken into account to produce a difference value x(i) of each feature value in three sample types, which is calculated by:

$$x(i) = \frac{E_A(i) - E_I(i)}{\text{mean}(E_A)},$$

where I=B, C; i=1, ..., 5, or $$x(i) = \frac{K_A(i) - K_I(i)}{\text{mean}(K_A)}$$

where I=B, C; i=1, ..., 8.

TABLE 3

The feature vector E of three sample types

| Sample number | Feature value E | | | | |
|---|---|---|---|---|---|
| | $E_1$ | $E_2$ | $E_3$ | $E_4$ | $E_5$ |
| S-A mean value | 2.3523 | 0.0405 | 0.2345 | 0.1260 | 0.2397 |
| S-B mean value | 3.0654 | 0.0345 | 0.4115 | 0.1550 | 0.3727 |
| Difference value x(1) | 119.1280% | 1.0023% | 29.5690% | 4.8446% | 22.2185% |
| S-C mean value | 2.4402 | 0.0408 | 0.2367 | 0.1337 | 0.2384 |
| Difference value x(2) | 14.6843% | 0.0501% | 0.3675% | 1.2863% | 0.2172% |

Table 3 shows that, for the three sample types, among the feature values under the same dimension, $E_1$ shows the highest amplitude, followed by the amplitudes of $E_3$ and $E_5$; and among the difference values of the feature values, the difference value between S-A and S-B corresponding to $E_1$, 119.128%, is the highest, followed by the difference values corresponding to $E_3$ and $E_5$ which are both over 20%. It can be concluded that in this set of feature values, the values $E_1$, $E_3$ and $E_5$ can fully reflect the difference between the two samples S-A and S-B in the absolute value and the relative value, and thus these three feature values are selected as elements of a new feature vector.

TABLE 4

The feature vector K of three sample types

| Sample number | Feature value K | | | | | | | |
|---|---|---|---|---|---|---|---|---|
| | $p_1$ | $p_2$ | $p_3$ | $p_4$ | $p_5$ | $p_6$ | $p_7$ | $p_8$ |
| S-A mean value | 0.0579 | 0.5261 | 0.0311 | 0.2786 | 0.0254 | 0.0469 | 0.0071 | 0.0270 |
| S-B mean value | 0.0574 | 0.5193 | 0.0321 | 0.2757 | 0.0303 | 0.0472 | 0.0096 | 0.0284 |
| Difference value x(1) | 0.400% | 5.439% | 0.799% | 2.319% | 3.919% | 0.240% | 1.999% | 1.119% |
| S-C mean value | 0.0794 | 0.4260 | 0.0423 | 0.3570 | 0.0084 | 0.0694 | 0.0022 | 0.0156 |
| Difference value x(2) | 17.19% | 80.07% | 8.959% | 62.71% | 13.59% | 17.99% | 3.919% | 9.119% |

Table 4 shows that, for the three sample types, among the feature values under the same dimension, $p_2$ shows the highest amplitude, followed by the amplitudes of $p_1$ and $p_4$; and among the difference values of the feature values, the difference value between S-A and S-C corresponding to $p_2$, 80.072%, is the highest, followed by the difference values corresponding to $p_1$ and $p_4$. It can be concluded that, in this set of feature values, $p_2$, $p_1$ and $p_4$ can fully reflect the difference between the samples S-A and S-C in the absolute value and the relative value, and thus these three feature values are selected as elements of the new feature vector.

TABLE 5

The feature vector B of three sample types

| Sample number | Feature value B | | | | |
|---|---|---|---|---|---|
| | $B_1$ | $B_2$ | $B_3$ | $B_4$ | $B_5$ |
| S-A mean value | 89.0691 | 1.5639 | 87.5821 | 2.0489 | 0.1655 |
| S-B mean value | 94.4294 | 1.9414 | 95.5298 | 1.8978 | 0.1621 |
| Difference value x(1) | 6.018% | 24.138% | 9.074% | 7.374% | 2.054% |
| S-C mean value | 90.1288 | 2.5793 | 153.5872 | 2.2600 | 1.7611 |
| Difference value x(2) | 1.189% | 64.927% | 75.363% | 10.303% | 964.108% |

Since the feature values of the feature vectors B and A listed in table 5 represent different indexes, and the difference between their value are large, the difference value is calculated as follows:

$$x(i) = \frac{B_A(i) - B_I(i)}{B_A(i)},$$

wherein I=B, C; i=1, . . . , 5, or $$x(i) = \frac{A_A(i) - A_I(i)}{A_A(i)},$$

wherein I=B, C; i=1, . . . , 9.

Table 5 shows that, for the three sample types, among the difference values of the feature values, the difference value between S-A and S-C corresponding to $B_5$, 964.1%, is the highest, followed by the difference values corresponding to $B_2$ and $B_3$. It can be concluded that, in this set of feature values, $B_5$, $B_2$ and $B_3$ can clearly reflect the differences between the three different samples, and thus these three feature values are selected as elements of the new feature vector.

TABLE 6

The feature vector A of three sample types

| Sample number | Feature value A | | | | | | | | |
|---|---|---|---|---|---|---|---|---|---|
| | $A_1$ | $A_2$ | $A_3$ | $A_4$ | $A_5$ | $A_6$ | $A_7$ | $A_8$ | $A_9$ |
| S-A mean value | 0.015 | 1.560 | 2.142 | 1.518 | 5.516 | 2.476 | 1.742 | 1.518 | 0.022 |
| S-B mean value | 0.016 | 1.685 | 2.207 | 1.602 | 6.455 | 3.367 | 1.808 | 1.467 | 0.027 |
| Difference value ×(1) | 7.09% | 8.03% | 3.07% | 5.57% | 17.0% | 36.0% | 3.78% | 3.35% | 23.5% |
| S-C mean value | 0.0121 | 1.5042 | 2.3419 | 1.5077 | 5.8520 | 5.3643 | 2.2087 | 1.8267 | 0.0257 |
| Difference value ×(2) | 15.48% | 3.59% | 9.33% | 0.69% | 6.09% | 116.6% | 26.7% | 20.2% | 16.2% |

Table 6 shows that, for the three sample types, among the difference values x(i) of the feature values, the difference value between the data corresponding to $A_6$, 116.6%, is the highest, followed by the difference values corresponding to $A_7$, $A_8$ and $A_9$. It can be concluded that, in this set of feature values, $A_6$, $A_7$, $A_8$ and $A_9$ can fully reflect the differences between the three different samples, and thus these four feature values are selected as elements of the new feature vector.

In summary, a final feature vector is obtained by selecting effective parameters in the four sets of feature vectors:

T=[$A_6,A_7,A_8,A_9,B_5,B_2,B_3,p_2,p_1,p_4,E_1,E_3,E_5$].

Since the feature parameters extracted above are constituted by different types of physical quantities, and the different physical quantities differ relatively largely from one another in the numerical value, in order to facilitate comparison between different physical quantities and convergence of SVM algorithm calculation, it is necessary to perform normalization to the feature parameters so as to accelerates the convergence speed of the model and improve the accuracy of the model. A commonly used normalization method is linear normalization, in which, input data is converted to be within the range from 0 to 1, and the formula is:

$$X_{norm} = \frac{X - X_{min}}{X_{max} - X_{min}}.$$

wherein, $X_{max}$ is the maximum value, $X_{min}$ is the minimum value of original data, $X_{norm}$ is a normalized value and X is the original data.

The feature values in the vector T=[$A_6,A_7,A_8,A_9,B_5,B_2,B_3,p_2,p_1,p_4,E_1,E_3,E_5$] are normalized, so that each obtained feature vector is constituted by thirteen feature values in the range of [0, 1], and there are 420 samples in total. According to the data in tables 1 to 6, take the feature vectors of one data sample of each of the three states as an example, wherein each feature vector is constituted by thirteen feature values, as shown in table 7.

TABLE 7

The feature vectors corresponding to three types of sample data

| | Serial number of feature vector | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Normal | 0.00 | 0.00 | 0.14 | 0.00 | 0.00 | 0.00 | 0.00 | 1.00 | 0.02 | 0.04 | 0.00 | 0.00 | 0.01 |
| Fault 1 | 0.31 | 0.14 | 0.00 | 1.00 | 0.00 | 0.37 | 0.12 | 0.93 | 0.00 | 0.00 | 1.00 | 1.00 | 1.00 |
| Fault 2 | 1.00 | 1.00 | 1.00 | 0.74 | 1.00 | 1.00 | 1.00 | 0.00 | 1.00 | 1.00 | 0.12 | 0.01 | 0.00 |

Figure 6:
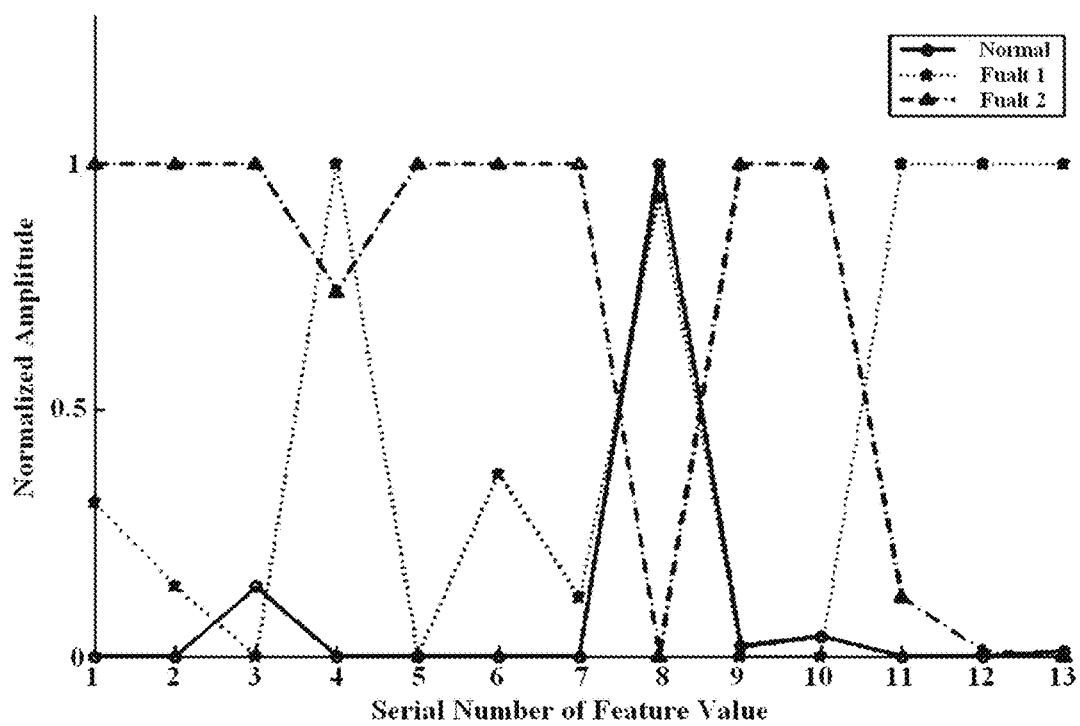
FIG. 6 shows the changes of various feature values corresponding to different sample types in the embodiment.

In order to observe the changes of the feature values in the feature vectors corresponding to the different types of GIL states, a line chart (FIG. 6) is drawn according to the data in table 7.

For the three different types of sample data, thirteen feature values represent different signal features respectively. These feature values can obviously reflect what state type the sample data belongs to. It can be seen from FIG. 6 that:

(1) For the seven feature values #1, #2, #3, #4, #6, #7 and #11 in the original feature vector, their normalized amplitudes are within the range from 0 to 1. Three different amplitude distributions can be observed corresponding to the three state types, and accordingly, GIL states corresponding thereto can be determined. Take the feature value #1 as example, the normalized amplitude of this feature value in the normal state is 0.0, 0.31 in the fault state 1 and 1.0 in the fault state 2. It is thus obvious that, we can determine what state types the data corresponds to, based on the feature value #1 which is obtained by extracting data in different states;

(2) For each of the four feature values #5, #8, #9 and #10, the amplitudes of the normal state and the amplitudes of the fault state 1 are distributed within the same range, while the amplitudes of the fault state 2 are distributed within a different range. Thus the normal state and the fault state can be distinguished based on the amplitudes of these four feature values.

(3) For the two feature values #12 and #13, their normalized amplitudes, in the range from 0 to 1, mainly present two distributions. The amplitudes of the normal state and the amplitudes of the fault state 2 are distributed within the same range, while the amplitudes of the fault state 1 are distributed within a different range. Thus these two feature values can be used to pick out the state type of the fault state 1.

In summary, the different feature values in the vector $T=[A_6,A_7,A_8,A_9,B_5,B_2,B_3,p_2,p_1,p_4,E_1,E_3,E_5]$ can characterize different state types, and the fault type can be identified based on the amplitude distribution of the feature values. Since the number of dimensions of the extracted feature vector is relatively larger, only three samples were analyzed in the tables 4 to 7. The results show that, for different state types, the amplitude distributions of the feature values are obviously different, and the boundary for determination is clear. However, as the amount of sample data increases, the amplitudes of the data will be distributed within a certain range and the boundary will be ambiguous to a certain degree; in this case, if the determination is made based on human experience, there will be a great chance to give wrong determination and thus it is difficult to guarantee the accuracy of fault diagnosis results. An intelligent fault recognition algorithm is introduced herein and the fault recognition model is constructed with the support vector machine for research on the fault diagnosis method.

(4) Optimization of the Feature Values

In the above feature extraction process, the number of dimensions of the extracted feature values is too large and this will result in adverse consequences such as a great calculation difficulty and reduction of result accuracy. In order to improve the fault judgment accuracy and reduce the excessive requirements of computation for configuration, the dimension-reduction analysis method of feature vectors will be discussed in this section. PCA is a common dimension reduction method and the PCA method substantially maps an original feature vector into a low-dimensional space after linear transformation while the original features can be maintained as completely as possible.

The main application steps of this method are as follows: firstly, combining feature vectors of all samples of the original data into a matrix and then performing normalization; then, calculating to give a covariance matrix of this matrix and feature values and feature vectors of the covariance matrix; next, combining the obtained feature vectors according to the feature values to give a mapping matrix, and taking the first n rows or first n columns of the mapping matrix as a final mapping matrix according to the specified number of features reserved by the PCA; and finally, mapping the original data with the mapping matrix so as to obtain a dimension-reduced result.

Figure 7:
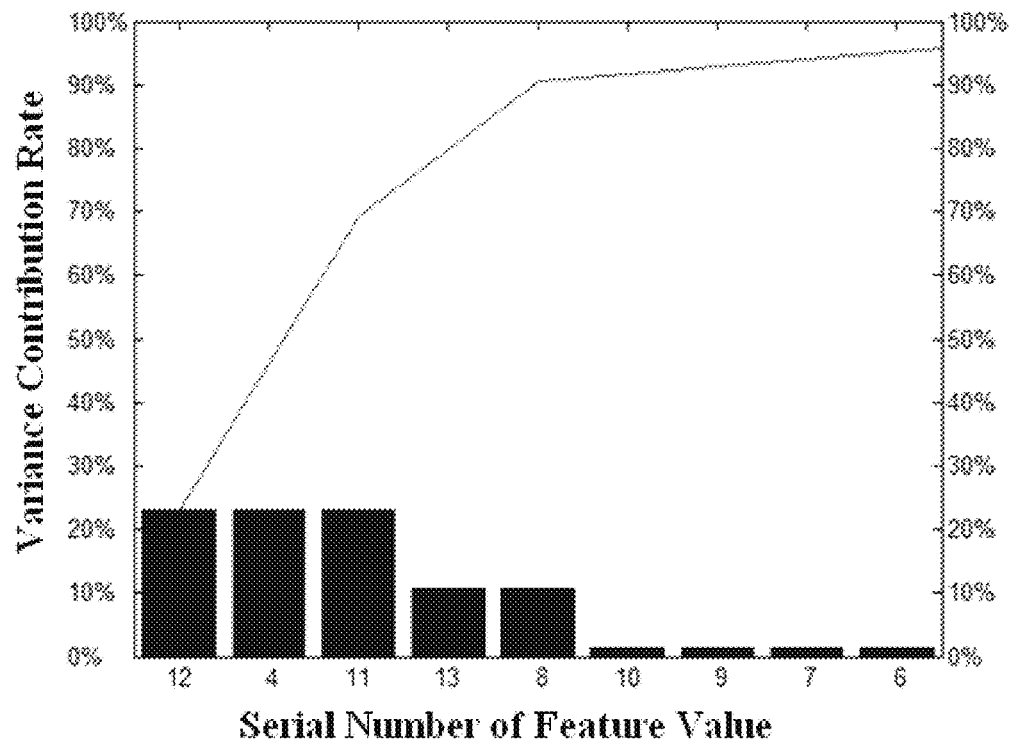
FIG. 7 is a contribution plot of principal components in PCA in the embodiment.

This method has achieved dimension reduction of information from a high-dimensional space to a low-dimensional space and reserved information features of the original data to the greatest extent. A new feature vector is obtained after dimension reduction is performed on the extracted feature vector. In the MATLAB, the dimension reduction of the feature vector is performed through the princomp(x) function and generally, the number of feature vectors subjected to dimension reduction is determined by calculating the contribution rate of the feature vectors. Through principal component analysis, the obtained variance contribution rates of the feature vectors are arranged according to a descending order. FIG. 7 is a contribution plot of principal components when the threshold value of the accumulated variance contribution rate is set to be 100%, wherein the upper solid line represents cumulative values of contribution rates.

It can be seen from FIG. 7 that the accumulated variance contribution rate of the five feature values #12 ($E_1$), #4 ($A_9$), #11 ($E_3$), #13 ($E_5$) and #8 ($p_2$) in the original feature vector reaches 92%, indicating that, when only the newly-generated first 5 dimensions of new feature values are used to replace the 13 dimensions of feature values of the original data, raw information can be expressed to a large degree (90% above), and the dimension reduction effect is remarkable.

The dimension number is changed according to a contribution degree of 90% and then a new feature vector $T=[E_1, A_9, E_3, E_5, p_2]$ with relatively lower dimensions is generated.

3. Construction and Training of SVM Fault Diagnosis Model

Feature extraction is performed on the vibration acceleration signals at different GIL states, and an SVM fault diagnosis model is constructed and trained by means of LIBSVM toolkit.

A radial basis function is adopted to construct the fault diagnosis model and the mathematical expression thereof is $$K(x, x_i) = \exp\left(-\frac{|x - x_i|^2}{2\sigma^2}\right),$$

wherein $\sigma$ is a kernel width parameter.

An optimization function for parameters is contained in the LIBSVM toolkit, and the SVM-based fault diagnosis model is constructed by combining the optimized parameters.

4. Based on the Fault Diagnosis Model, Diagnosing the Fault, Identifying the Type of the Fault and Locating the Fault.

The above detailed description is the specific description for feasible embodiments of the present invention. These embodiments are not intended to limit the scope of the present invention and equivalent embodiments or modifications made without departing from the present invention shall fall within the scope of the present invention.

The invention claimed is:

1. A gas-insulated metal-enclosed transmission line (GIL) fault on-line monitoring system adapted to determine a fault based on vibration signals and a support vector machine, comprising:
a vibration sensor secured to a shell of a post insulator of a GIL to be monitored; and
a data collector coupled to an output end of the vibration sensor and coupled to a wireless gateway through a wireless manner and a terminal computer via the wireless gateway, wherein the data collector includes an amplifier coupled to the output end of the vibration sensor, a wave filter, an analog-to-digital converter, a microcontroller unit, and a wireless communication module coupled sequentially, wherein the wireless communication module is coupled to the wireless gateway via radio signals, wherein the terminal computer, via a support vector machine-based (SVM) fault recognition model, is adapted to determine whether the GIL is experiencing a fault, identify a type of the fault, and locate the fault, and wherein for diagnosing the GIL fault, the support vector machine is adapted to perform following steps:
acquiring vibration acceleration signals under different GIL states, and classifying the vibration acceleration signals using the GIL states as labels and using corresponding vibration acceleration signal data as corresponding data samples;

extracting feature parameters of the vibration acceleration signals in a time domain, a frequency domain, and a time-frequency domain;

performing feature extraction on the vibration acceleration signals at the different GIL states, and constructing and training a SVM fault diagnosis model using a library for support vector machines (LIBSVM) toolkit, and a mathematical expression of the SVM fault diagnosis model is as follows:

$$K(x, x_i) = \exp\left(-\frac{|x - x_i|^2}{2\sigma^2}\right),$$

wherein $\sigma$ is a kernel width parameter, K is a radial basis function kernel, x is a first data point, and $x_i$ is an ith data point; and, diagnosing the fault, identifying the type of the fault, and locating the fault based on the SVM fault diagnosis model.

2. The GIL fault on-line monitoring system according to claim 1, wherein the vibration sensor is an acceleration sensor and a +3 dB frequency of the acceleration sensor ranges from 50 Hz to 15 kHz.

3. The GIL fault on-line monitoring system according to claim 1, wherein, the vibration sensor is attached to the shell of the post insulator, wherein a size and a curvature of the vibration sensor are adjustable according to a size of the shell of the post insulator.

4. The GIL fault on-line monitoring system according to claim 1, wherein radio signals containing time information are sent by the terminal computer to realize time synchronization between data collectors and the terminal computer, wherein time signals are sent to the data collectors through wireless signals, and wherein the data collectors are configured to receive the time signals simultaneously to realize the time synchronization between the data collectors based on the signals.

5. The GIL fault on-line monitoring system according to claim 1, wherein for the step of extracting feature parameters of the vibration acceleration signals, the support vector machine is adapted to perform the following steps:

extracting a dimensional feature vector $A=[A_1, A_2, \ldots, A_{10}]$ and a dimensionless feature vector $B=[B_1, B_2, \ldots, B_6]$ in the time domain;

extracting a feature vector $E=[E_1, E_2, \ldots, E_5]$ in the frequency domain;

extracting a feature vector $K=[p_0, p_1, \ldots, p_{2^j-1}]$ in the time-frequency domain;

selecting a feature vector containing thirteen feature values:

$T=[A_6, A_7, A_8, A_9, B_5, B_2, B_3, p_2, p_1, p_4, E_1, E_3, E_5]$; and changing a dimension number according to a contribution degree of 90% from the feature vector to produce a feature vector that has a lower dimension number.

* * * * *